United States Patent [19] [11] 3,744,802

Bowerman [45] July 10, 1973

[54] TONE ARM FOR RECORD TURN TABLE

[76] Inventor: William R. Bowerman, 1824 Mississippi Street, Lawrence, Kans. 66044

[22] Filed: Dec. 21, 1970

[21] Appl. No.: 100,036

[52] U.S. Cl. .................................. 274/1 R, 274/23

[51] Int. Cl. .............................................. G11b 3/10

[58] Field of Search .................... 274/24, 23, 25, 26, 274/1 R, 6

[56] References Cited

UNITED STATES PATENTS

| | | | |
|---|---|---|---|
| 3,623,734 | 11/1971 | Sakamoto | 274/1 R |
| 3,356,372 | 12/1967 | Rabinow | 274/23 A |
| 3,479,038 | 11/1969 | Eisner | 274/23 A |
| 2,489,062 | 11/1949 | Thompson | 274/24 R |
| 3,101,952 | 8/1963 | Godfrey et al. | 274/24 R |

*Primary Examiner*—Harry N. Haroian
*Attorney*—Morse, Altman & Oates

[57] ABSTRACT

A tone arm for a record turntable is movable in the horizontal plane only, the needle tip being independently movable into and out of engagement with the record surface. A fluidic system controls the pressure of the needle against the record through an extensible bellows supporting the needle. An air jet control system is also provided for moving the tone arm with respect to the record surface. In one instance, the tone arm moves by a jetting action along a radial path, the arm being hinged to open or closed air ports on a carriage mounted for movement along a transverse support. In another embodiment, a pivoted tone arm is provided with jet ports at its outer end for selective pivoting action of the arm.

6 Claims, 5 Drawing Figures

PATENTED JUL 10 1973

3.744.802

INVENTOR
WILLIAM R. BOWERMAN
BY Moss, Altman & Oates
ATTORNEY

TONE ARM FOR RECORD TURN TABLE

BACKGROUND OF THE INVENTION

1. Field of the Invention

This invention relates generally to tone arms for record players and more particularly is directed towards a novel fluid controlled record tone arm of improved construction of design.

2. Summary of the Prior Art

Conventional phonographs employ a tone arm which is pivoted about a pair of mutually perpendicular axes permitting the needle to traverse the record as it plays and then to lift up and return to a start position when the record is finished. The mechanism for achieving these motions is relatively complex, expensive and is not particularly durable. Furthermore, conventional tone arms require rather frequent adjustment to insure proper operating pressure between the needle and the record.

Accordingly, it is an object of the present invention to provide improvements in tone arms for phonographs. A more particular object of this invention is to provide a phonograph tone arm wherein the arm is movable in one plane only the needle being independently movable of the arm. Yet another object of this invention is to provide a tone arm wherein the needle pressure is self-adjusting.

SUMMARY OF THE INVENTION

This invention features a tone arm for phonographs comprising an arm pivotally mounted about one axis only and an extensible needle support adapted to reciprocate along another axis. The tip support preferably is in the form of a spring bellows. A pressure sensing transducer is employed to sense the pressure between the needle and the record and through a control system is adapted to increase or decrease the fluid pressure accordingly. In a modification of the invention, air jets are employed to move the tone arm over the record.

DETAILED DESCRIPTION OF THE PREFERRED EMBODIMENTS

Figure 1:
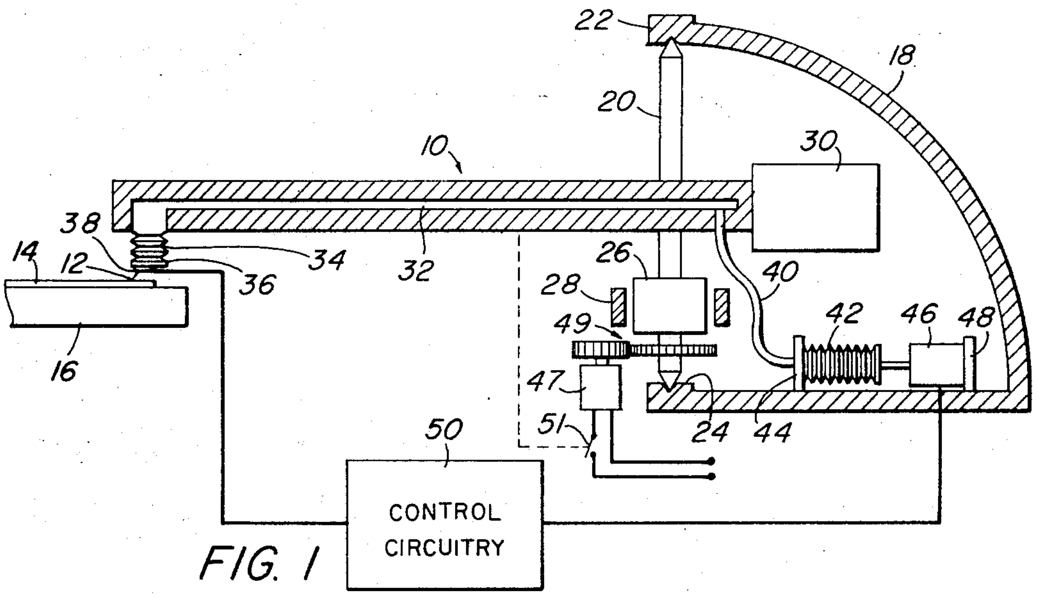
FIG. 1 is a sectional view in side elevation, somewhat schematic, of a phonograph tone arm made according to the invention.

Referring now to the drawings and to FIG. 1 in particular, the reference character 10 generally indicates a tone arm for a phonograph player and adapted to move a needle 12 over a record 14 rotating on a turntable 16. The tone arm 10 is pivotally mounted to a frame 18 for movement about a single axis typically a vertical axis, and is provided for this purpose with a vertical shaft 20 the ends of which are rotatably mounted in bearings 22 and 24 on the frame 18. The shaft 20 is provided with an enlarged hub 26 which may serve as a brake drum in cooperation with brake bands 28 for locking the arm 10 in a pre-selected angular position. A counterweight 30 typically is provided on the inner end of the arm 10 to provide a balanced system.

In the illustrated embodiment, the tone arm 10 is formed with a longitudinal passage 32 extending substantially the full length thereof and communicating at its outer end with the interior of a spring bellows 34 sealed to the lower outer end of the tone arm and closed at its lower end by a wall 36. A pressure transducer 38 is attached to the wall 36 and engages the needle tip 12 for reasons that will presently appear. The spring bellows 34 is normally retracted but is adapted to extend vertically down from the arm 10 to and away from the record 14. The opposite end of the passage 32 is connected via a flexible conduit 40 to another spring bellows 42 fixed by means of a bracket 44 to the frame 18. The bellows 42 is normally extended and is drivingly connected to a solenoid 46 fixed to a bracket 48. The solenoid 46 is operably connected through control circuitry 50 to the transducer 38.

In practice, the passage 32 and the bellows 34 and 42 are filled with a fluid, which may be gas or liquid, whereby compression of the bellows 42 will cause the bellows 34 to extend and vice versa. In this fashion, the needle tip 12 may be retracted or extended as required. The pressure of the needle against the record surface is maintained at a predetermined level by means of the transducer 38 which may be any one of a variety of devices adapted to sense small changes in pressure and provide an output by which the pressure may be adjusted. For this purpose, a highly sensitive strain gauge may be employed as one arm of a Wheatstone bridge in a pressure sensing circuit. The Wheatstone bridge in turn may be used to control and signal to the solenoid 46 by well known techniques. The bellows 34 is relatively stiff to resist bending or deflection in a direction perpendicular to its vertical axis.

The configuration of the tone arm simplifies the mechanism insofar as it is necessary to provide a pivoting mount for one axis only, reducing the parts and providing better control over the needle tip.

An automatic return system for the tone arm is provided and includes a motor 47 drivingly connected to the shaft 20 by means of gears 49. A limit switch 51 is located at the end of the path of travel of the tone arm to energize the motor 47, after the needle is retracted and return the tone arm to a start or rest position. A clutching arrangement may be provided to minimize drag on the tone arm during its normal playing movement.

Figures 2, 3:
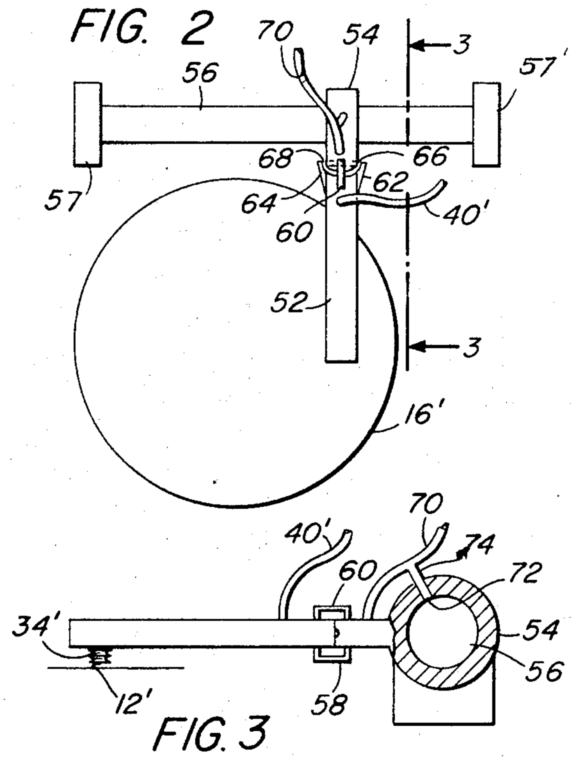
FIG. 2 is a top plan view of a modification of the invention.
FIG. 3 is a cross-sectional view taken along the line 3—3 of FIG. 2.

Referring now to FIGS. 2 and 3 of the drawings, there is illustrated a modification of the invention and in this embodiment a radial motion tone arm system is provided. In the embodiment of FIGS. 2 and 3, a tone arm 52 extends outwardly from a carriage 54 slidably mounted along a fixed guide 56 supported at its ends by brackets 57 and 57'. The tone arm 52 normally is perpendicular to the guide 56 and extends out across a turntable 16' to carry a needle 12' along a radial path with respect to a record on the turntable. As the table turns, the needle moves inwardly along a true radial path while the tone arm moves from right to left as viewed in FIG. 2 along the guide 56. As in the principal embodiment, the needle tip 12' is mounted to the tone arm by means of an extensible spring bellows 34' operated in the same fashion as the principal embodiment through a fluidic control system.

The tone arm 52 is pivotally connected to the carriage 54 by means of hinge members 58 and 60 which permit the tone arm to swing only in the horizontal plane. The tone arm is formed with rearwardly extending valve portions 62 and 64 on each side of the tone arm adapted to open and close discharge ports 66 and 68 on either side of the carriage 54 near the hinged joint. Compressed air is introduced to a passage within the carriage by means of a conduit 70 and air is released from either port 66 or 68 whenever the tone arm 52 is biased in one direction or the other. Thus, when the tone arm 52, for example, moves angularly to the left as viewed in FIG. 2 as a result of the needle moving inwardly on the record, this will open port 66 on the carriage releasing a jet of air which will push the carriage 54 to the left along the guide 56 and return the tone arm 52 into alignment with the carriage. In the event that there is an overtravel, the arm 52 will deflect to the right opening port 68, which in turn, will release an air jet to return the carriage and tone arm into alignment. In this fashion the tone arm will move smoothly along with the tip moving towards the center of the record at an optimum angular position for record playing. The carriage in the preferred embodiment rides on an air-bearing formed between the inner surface of the carriage 54 and the outer surface of the guide 56. Air pressure is introduced between these parts through a port 72 connected to the conduit 70 by a line 74.

Figure 4:
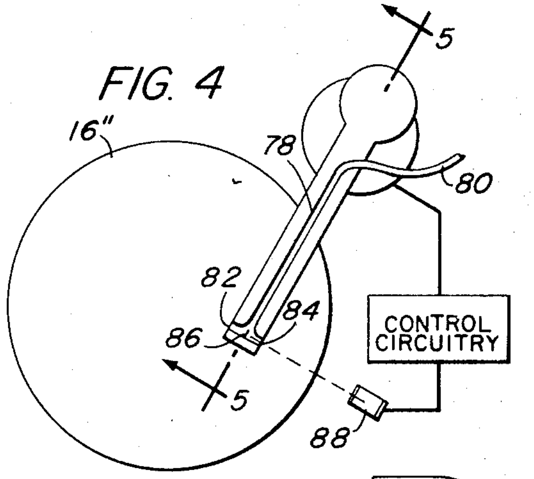
FIG. 4 is a top plan view, partly in section and partly schematic, showing a further modification of the invention, and, FIG. 5 is a cross-sectional view taken along the line 5—5 of FIG. 4.
Figure 5:
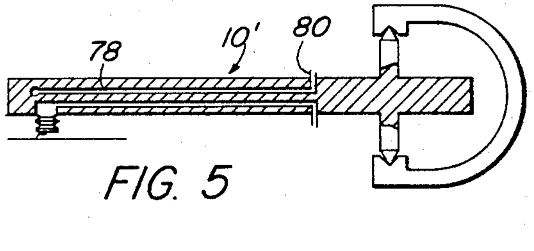

Referring now to FIGS. 4 and 5, there is illustrated a further modification of the invention and in this embodiment a tone arm 10' similar in construction and support to the tone arm of the FIG. 1 embodiment, movable in a single plane only, is provided with an internal passage 78 connected by a conduit 80 to a source of compressed air and terminating at the outer end of the tone arm in a pair of oppositely directed ports 82 and 84. The ports are controlled by a single valve 86, typically operated by solenoid 88 carried by the arm 10' and which valve directs air from one port or the other depending upon which direction the arm is to be pivoted. In the valve position of FIG. 4, air is released from the left-hand port 82 which will cause a counterclockwise motion of the tone arm to return the tone arm to a rest position. When a record is to be played, a control signal to the solenoid 88 will flip the valve 86 so that the port 84 will be opened, releasing a jet of air and causing the arm to pivot in a clockwise direction to a playing position. Automatic start and return controls may be provided as in the principal embodiment.

Having thus described the invention what I claim and desire to obtain by Letters Patent of the United States is:

1. A phonograph, comprising in combination
a. a record turntable,
b. a tone arm mounted to said phonograph in spaced relation to said turntable and movable only in a plane parallel to said turntable,
c. extensible needle support means including a bellows mounted to said arm for movement to and away from said turntable independently of the movement of said arm, and,
d. fluidic control means for selectively actuating said support means,
e. said control means including a variable pressure fluidic system connected to said bellows for selective extension and retraction thereof.

2. A phonograph according to claim 1 wherein said fluidic system includes another bellows remote from the first bellows, conduit means connecting both of said bellows and actuating means connected to said other bellows for selective extension and retraction thereof whereby the first bellows will be selectively extended and retracted.

3. A phonograph according to claim 2 wherein said actuating means is a solenoid.

4. A phonograph, comprising in combination
a. a record turntable,
b. a tone arm mounted to said phonograph in spaced relation to said turntable and movable only in a plane parallel to said turntable,
c. extensible needle support means mounted to said arm for movement to and away from said turntable independently of the movement of said arm,
d. fluidic control means for selectively actuating said support means, and,
e. pressure sensing means connected to said support means and operatively connected to said control means for selectively extending and retracting said support means in response to changing pressure against said support means.

5. A phonograph, comprising in combination
a. a record turntable,
b. a tone arm mounted to said phonograph in spaced relation to said turntable and movable only in a plane parallel to said turntable,
c. extensible needle support means mounted to said arm for movement to and away from said turntable independently of the movement of said arm, and,
d. fluidic control means for selectively actuating said support means,
e. said arm being pivotally mounted about an axis perpendicular to said plane,
f. said arm including selectively operable nozzle means adjacent the tip end thereof and compressed gas means connected thereto for pivoting said arm.

6. A phonograph, comprising in combination
a. a record turntable,
b. a tone arm mounted to said phonograph in spaced relation to said turntable and movable only in a plane parallel to said turntable,
c. extensible needle support means mounted to said arm for movement to and away from said turntable independently of the movement of said arm,
d. fluidic control means for selectively actuating said support means,
e. an elongated guide parallel to said plane and perpendicular to said arm, said arm being movably mounted along said guide and extending in spaced relation over said turntable in position to traverse a needle radially across said turntable and an air bearing formed between said guide and said arm,
f. a carriage mounted to said guide and said arm being pivotally connected to said carriage for angular movement in said plane, oppositely facing ports formed in said carriage, means connecting said ports to a source of compressed gas, and valve means on said arm in position to open and close said ports upon angular movement of said arm for urging said carriage along said guide.

* * * * *